Aug. 30, 1966　　　A. A. HEYMAN　　　3,269,335
MACHINE FOR FORMING FLAT TOP ROLLED ICE CREAM CONTAINERS
Filed Feb. 5, 1964　　　　　　　　　　　　　3 Sheets-Sheet 1

INVENTOR
ALBERT A. HEYMAN

BY *Albert J. Kramer*
ATTORNEY

Aug. 30, 1966  A. A. HEYMAN  3,269,335
MACHINE FOR FORMING FLAT TOP ROLLED ICE CREAM CONTAINERS
Filed Feb. 5, 1964  3 Sheets-Sheet 2
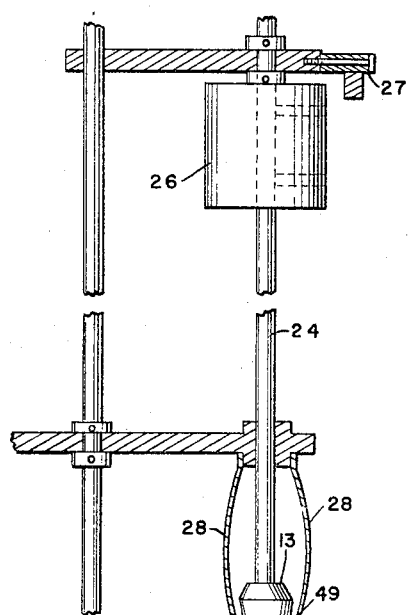
FIG. 2.
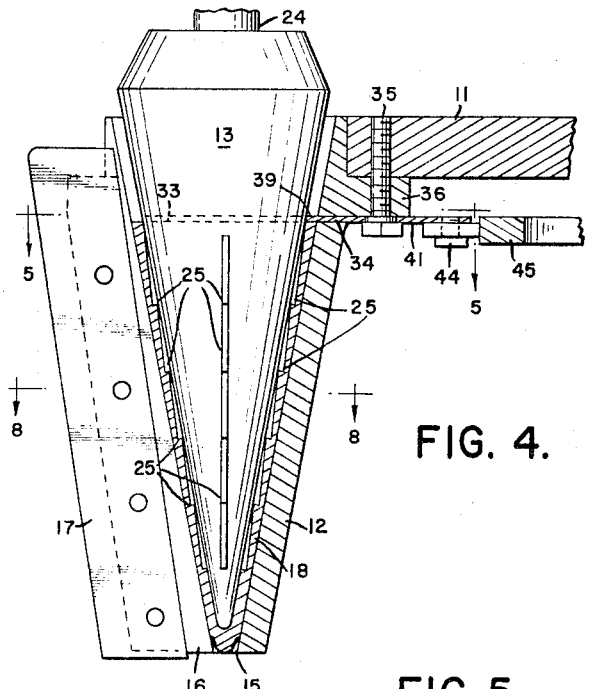
FIG. 4.
FIG. 5.
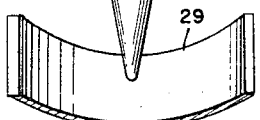
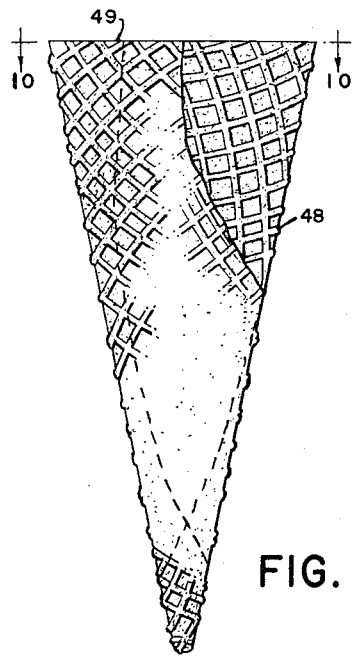
FIG. 9.
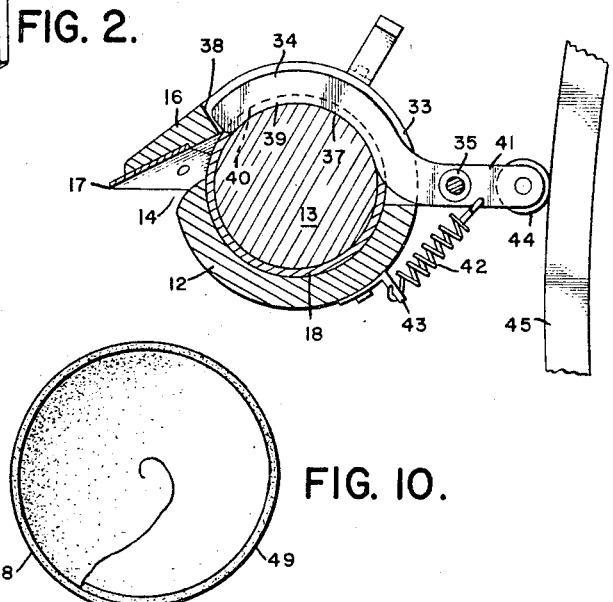
FIG. 10.
INVENTOR
ALBERT A. HEYMAN
BY Albert J. Kramer
ATTORNEY Aug. 30, 1966  A. A. HEYMAN  3,269,335
MACHINE FOR FORMING FLAT TOP ROLLED ICE CREAM CONTAINERS
Filed Feb. 5, 1964  3 Sheets-Sheet 3

INVENTOR
ALBERT A. HEYMAN

BY *Albert J. Kramer*

ATTORNEY

United States Patent Office 3,269,335
Patented August 30, 1966

3,269,335
MACHINE FOR FORMING FLAT TOP ROLLED
ICE CREAM CONTAINERS
Albert A. Heyman, Baltimore, Md., assignor to The
Maryland Baking Company, Baltimore, Md., a corporation of Maryland
Filed Feb. 5, 1964, Ser. No. 342,646
4 Claims. (Cl. 107—8)

This invention relates to the manufacture of ice cream containers and it is more particularly concerned with a machine for manufacturing rolled pastry containers in which the top or rim of the container is flat, that is, in a plane at right angles to its longitudinal axis.

In the manufacture of rolled pastry containers, it has been a problem to provide them with a flat top as in the case of the molded type of pastry containers, that is, containers made by pouring a fluid pastry batter into molds and baking them in the mold until they are rigid. The rim of the conventional rolled container is uneven, slanted and irregular in shape. As a consequence, scoops of ice cream placed on the rim of such containers are not firmly and evenly supported thereby. On the contrary, they are poised at an angle with varying degrees of exposure of the ice cream from the side. This condition renders a scoop of ice cream easy to unseat from the containers, especially by children who are the greatest consumers of the product and who are not conscious of the situation. Also, the ice cream tends to melt faster at the more exposed surfaces so that the side where the rim is lowermost frequently becomes overrun with liquid ice cream before the ice cream can be eaten to a point below the rim level.

The general objects of the invention comprise the manufacture of a rolled pastry container that obviates the deficiencies of the prior art explained above and the provision of a machine for its manufacture.

A specific object of the invention is the manufacture of a rolled pastry container having a flat top and the provision of a machine for manufacturing it.

Another object is the provision of such a machine which can be provided by simple modifications of an existing machine of the prior art.

A further object is the provision of such a machine which is essentially automatic in operation.

These and still further objects, advantages and features of the invention will appear more fully from the following description considered together with the accompanying drawing.

In the drawing:

FIG. 2 is a fragmentary portion of the same machine at the discharge station, partly in section, showing a completed cone in the process of being removed from a spindle.

FIG. 4 is a detailed vertical sectional view of a cone molding element on a larger scale in the initial stage of the rolling operation.

FIG. 5 is a sectional view along the line 5—5 of FIG. 4 with the edges in its inwardmost position.

FIG. 9 is a front elevational view of a completed cone in accordance with this invention.

FIG. 10 is a plan view along the line 10—10 of FIG. 9.

Figure 1:
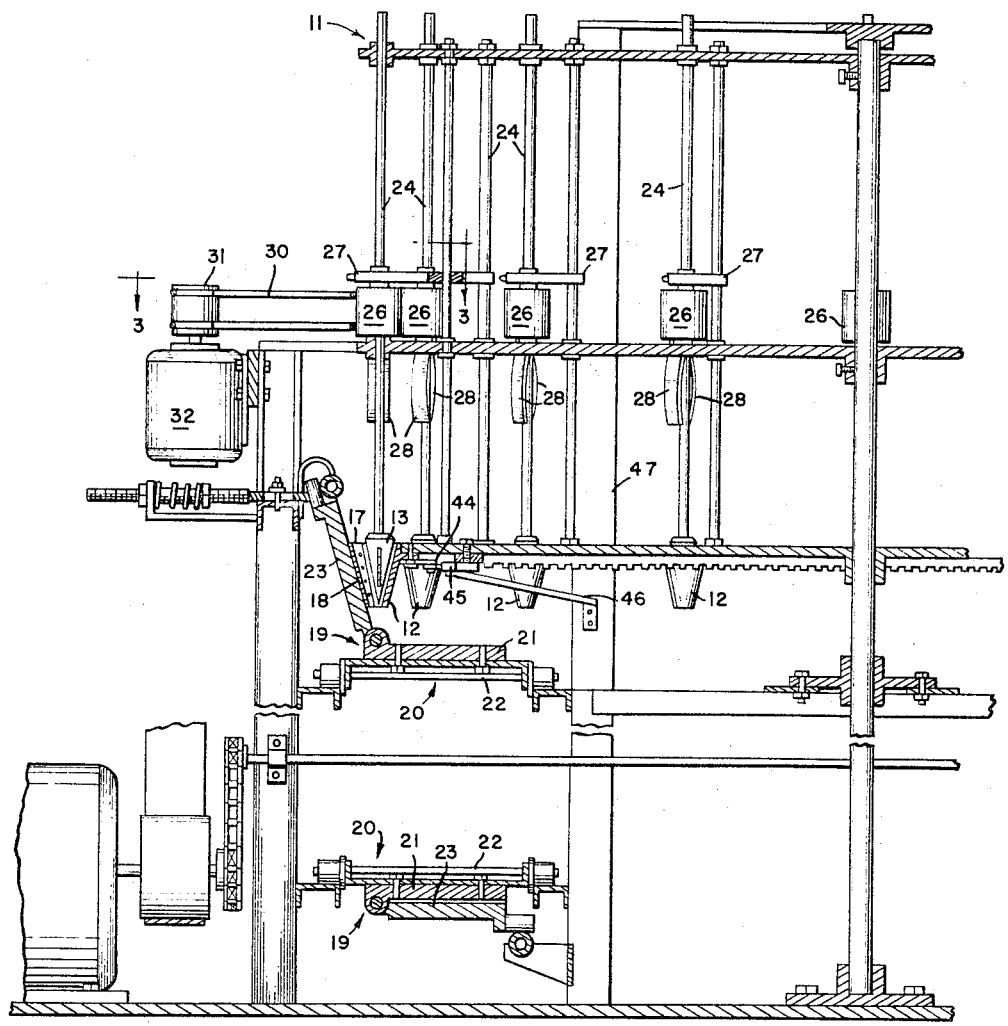
FIG. 1 is a vertical sectional view through a portion of a machine of the prior art modified in accordance with an embodiment of this invention.
Figure 6:
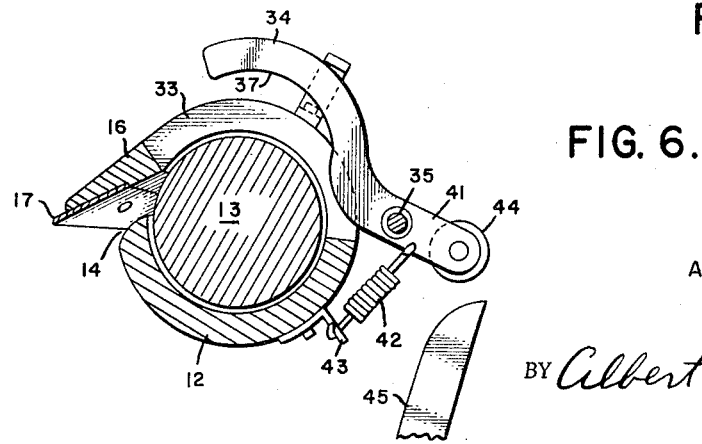
FIG. 6 is a view similar to FIG. 5 with the edges in its outermost position.
Figure 7:
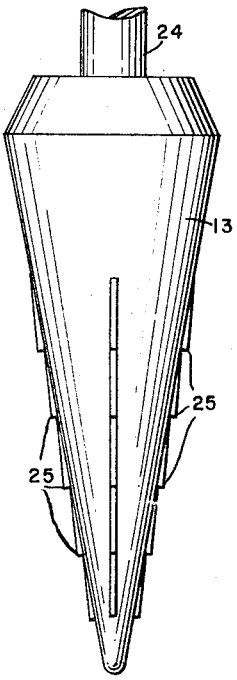
FIG. 7 is a fragmentary view partly in section of a pair of mold parts vertically separated.

The embodiment illustrated is essentially a machine that comprises a modification of the machine described in U.S. Patent No. 2,628,576 and to the extent that parts are common to both, reference is made to said prior patent for a full description thereof. Essentially, the machine comprises the combination of a rotary frame 11, a plurality of circularly arranged female cone molds 12 carried thereby. Wafer rolling means comprising rotary spindle 13 are associated with the molds 12 and each mold is provided with a feed slot 14 extending from its apex 15 through and along its wall. A portion 16 of the mold 12 adjacent the slot extends outwardly and carries a scraper 17 for transferring wafers 18 from wafer bearing grids 19 of a wafer baking unit 20. These wafer bearing grids 19 comprise each a fixed inner part 21 attached to a conveyor 22 and an outer part 23 hinged to the inner part 21. Means are provided for opening the hinged parts 23 and presenting the wafer bearing surface thereof in inclined position along a path substantially tangential to the path of rotation of the scrapers 17 and in a position for engaging the wafers 18 on the mold parts 23 with the scrapers of successive molds in order to remove them from the grids and guide them into the slots 14, respectively, of the molds 12.

A wafer entering a mold 12 is engaged by a spindle 13 each carried at the lower end of a vertical shaft 24 mounted on the frame 11. Triangular projections 25 on the face of the spindles 13 result in a positive engagement of the wafers with the spindle and retention thereon until removed by a stripping device described hereinafter. These shafts are provided with rollers 26 and also with camming arms 27. The camming arms are adapted to engage a camming track (not shown) for the purpose of elevating the shafts 24 consecutively with the spindles 13 after the wafers are received in the molds and rotated by the spindles to form the cones.

On elevation of a spindle 13 with a cone clinging thereto the upper edge of the cone engages a pair of resilient fingers 28 (see FIG. 2) mounted on the frame 11 in straddling relation to the shaft 24 which has the effect of removing the cone from the spindle, whereupon it is dropped into a trough 29 and slides thereon under the force of gravity to a discharge station (not shown).

Rotation of the spindles 13 is effected during the time they are inside the molds 12 by a peripheral unit 29 (see FIG. 1) adjacent the rotary frame 11. The unit 29 comprises an endless belt 30 in a horizontal plane supported on pulleys 31 and driven by a motor 32. The belt 30 is adapted to contact the rollers 26 for that portion of their revolution when they are inside the molds 12.

The present invention comprises a modification of the mold member 12 for the purpose of producing a flat top to the finished cone. The modification comprises a mold having a transverse slot 33 through one side of the wall thereof and a flat member 34 pivoted by a bolt 35 to a boss 36 integral with the mold and extending toward the center of the frame 11. This bolt also serves to attach the mold in the frame 11. The member 34 is curved at 37 and shaped to conform to the curvature of the mold at that elevation and to register with the slot 32. An abutment 38 on the mold for the outer end of the arm 34 limits its inward movement to a protracted position where a portion 39 thereof overhangs the adjacent inner edge 40 of the mold 12 along the interior wall. (See FIG. 5.)

The member 34 has an arm 41 on the opposite side of the bolt 35 and it is biased to a retracted position by a tensioned coil spring 42 having one end connected to the arm 41 and the other end connected to an anchor bracket 43 on the side of the mold 12.

The arm 41 also carries a roller 44 which is adapted to contact a camming track 45 supported by brackets 46 on stationary structural members 47 on the outside of the rotary frame 11.

Figure 3:
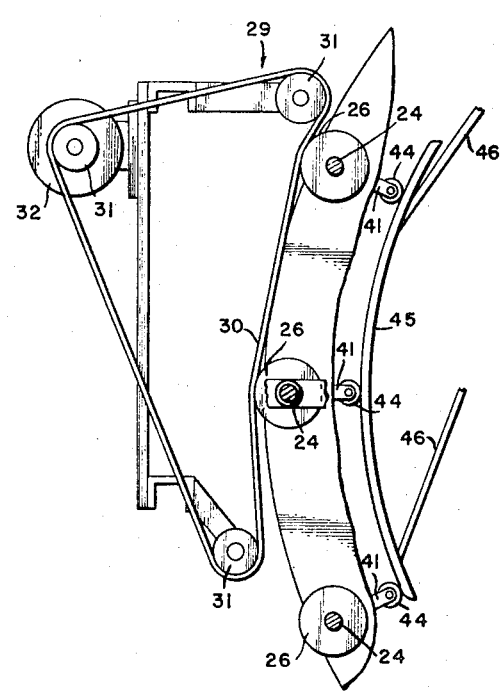
FIG. 3 is a plan sectional view along the line 3—3 of FIG. 1.
Figure 8:
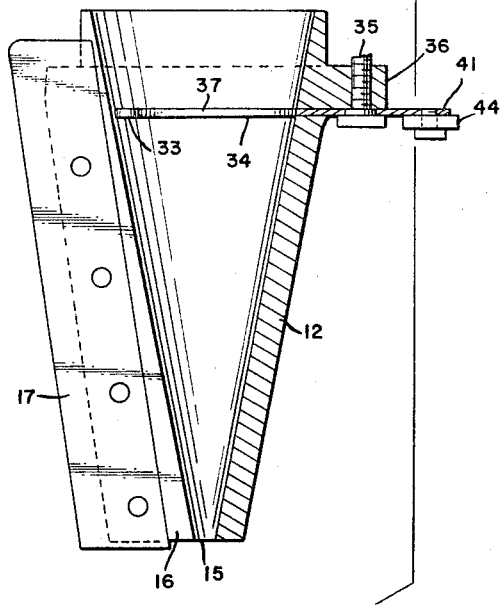
FIG. 8 is a section along the line 8—8 of FIG. 4.
Figure 8:
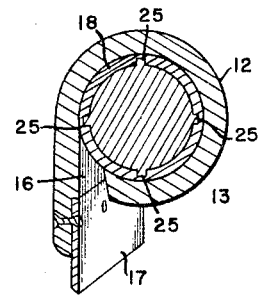

The track 45 extends between points corresponding generally to the effective distance through which the spindles 13 are rotated under the influence of the unit 29. (See FIG. 3.)

As a result of this arrangement, when a wafer 18 enters a mold 12, is engaged by a spindle 13, and is spun around therewith, the top edge of the wafer is pressed during the rotation against the overhanging edge portion 39 of the member 34 which results in the formation of a cone 48 having a flat top 49. (See FIG. 9.) After the cone 48 is completed, the member 34 is retracted under the action of the spring 42 when the roller 44 rides off the track 45 and thus clears the mold for removal of the cone by the stripping fingers 28 as explained above.

Having thus described my invention, I claim:

1. A cone rolling machine having a hollow conical mold for receiving a wafer to be rolled into the shape of a cone, a mandrel for rolling the wafer in the mold and subsequently removing it therefrom after the cone is formed, said mold having a transverse slot therethrough on one side in a plane perpendicular to the longitudinal axis of the mold at a distance from the apex of the mold corresponding to the length of the cone to be formed, an arm pivoted to the mold, said arm being movable between a first position within the slot overhanging the inner wall of the mold adjacent thereto and a second position clear of the inner wall of the mold, and means for moving the arm between said positions during the rolling of the wafer and during its subsequent removal from the mold, respectively.

2. A cone rolling machine as defined by claim 1 in which the arm has a radius of curvature corresponding to the radius of curvature of the mold at the slot.

3. A cone rolling machine as defined by claim 1 and resiliently yieldable means for holding the arm in the second position and means for moving the arm to the first position against the action of the yieldable means.

4. A cone rolling machine comprising a rotary frame, a hollow conical mold carried by the mold, said mold being adapted to receive on its interior a wafer to be rolled into the shape of a cone, a mandrel for rolling the wafer in the mold and subsequently removing it therefrom, said mandrel being attached to the rotary frame for movement therewith and for rotational reciprocal movement thereon relative to the mold, means for rotating the frame and means for selectively reciprocating the mandrel thereon and rotating it within the mold, said mold having a transverse slot therethrough on one side in a plane perpendicular to the longitudinal axis of the mold at a distance from the apex of the mold corresponding to the length of the cone to be formed, an arm pivoted to the mold, said arm being movable between a first position within the slot overhanging the inner wall of the mold adjacent thereto and a second position clear of the inner wall of the mold, resiliently yieldable means for holding the arm in the second position, and camming means for moving the arm against the action of the resilient means, said camming means comprising a camming roller carried by the lever and a stationary camming track adapted to engage the roller when the mandrel is disposed within the mold.

References Cited by the Examiner

UNITED STATES PATENTS

| | | | |
|---|---|---|---|
| 2,628,576 | 2/1953 | Finke | 107—58 X |
| 3,157,134 | 11/1964 | Heyman | 107—4 |

WILLIAM I. PRICE, *Primary Examiner.*